(12) United States Patent
Christoph et al.

(10) Patent No.: US 8,165,310 B2
(45) Date of Patent: Apr. 24, 2012

(54) DEREVERBERATION AND FEEDBACK COMPENSATION SYSTEM

(75) Inventors: Markus Christoph, Straubing (DE);
Tim Haulick, Blaubeuren (DE);
Gerhard Uwe Schmidt, Ulm (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1271 days.

(21) Appl. No.: 11/411,004

(22) Filed: Apr. 25, 2006

(65) Prior Publication Data

US 2007/0110254 A1 May 17, 2007

(30) Foreign Application Priority Data

Apr. 29, 2005 (EP) .................................... 05009446

(51) Int. Cl.
*H04B 3/20* (2006.01)
*A61F 11/06* (2006.01)
*H04R 3/00* (2006.01)

(52) U.S. Cl. ........... 381/66; 381/71.11; 381/92; 381/95; 381/112

(58) Field of Classification Search .................... 381/66, 381/95, 73.1, 122, 56, 71.11, 92; 700/94
See application file for complete search history.

(56) References Cited

U.S. PATENT DOCUMENTS

| 5,912,966 | A | * | 6/1999 | Ho ........................... 379/406.05 |
| 6,389,440 | B1 | | 5/2002 | Lewis et al. |
| 7,171,003 | B1 | * | 1/2007 | Venkatesh et al. .............. 381/66 |
| 2003/0061032 | A1 | | 3/2003 | Gonopolskiy |
| 2004/0170284 | A1 | | 9/2004 | Janse et al. |
| 2005/0047609 | A1 | | 3/2005 | Buchner et al. |

FOREIGN PATENT DOCUMENTS

| EP | 1 429 315 A1 | 6/2004 |
| WO | WO 98/06185 | 2/1998 |
| WO | WO 02/32356 A1 | 4/2002 |

* cited by examiner

*Primary Examiner* — Vivian Chin
*Assistant Examiner* — Douglas Suthers

(57) ABSTRACT

A dereverberation and feedback compensation system reduces the echo received by a first audio device while reducing the speech feedback received from a second audio device. A decorrelation logic decorrelates audio signals from the first audio device. A first processor generates a noise compensation signal based on the decorrelated audio signals and system determined filter coefficients. The second processor generates an enhanced noise correlation signal based on speech signals of a second audio device and the filter coefficients used by the first processor.

21 Claims, 7 Drawing Sheets

DEREVERBERATION AND FEEDBACK COMPENSATION SYSTEM

BACKGROUND OF THE INVENTION

1. Priority Claim.

This application claims the benefit of priority from European Patent Application No. 05009446.5, filed Apr. 29, 2005, which is incorporated by reference.

2. Technical Field.

This application relates to an audio signal processing system, and more particularly to a dereverberation and feedback compensation system.

3. Related Art.

Verbal communication may be affected by a noisy background. This may occur when passengers in a vehicle attempt to communicate with one another. At high traveling speeds, dialogs between back and front passengers may be easily disturbed by background noise. If additional audio signals, such as from a radio, a compact disc ("CD") player, and/or a digital video disc ("DVD") player are output during the conversation, the intelligibility of the utterances further deteriorates.

To improve the intelligibility of the passengers' utterances, some communication systems installed within vehicles use microphones installed near each seat of the cabin which can detect speech signals from the passengers. The signal received by the microphones are processed by a signal processor and converted into audible sound by loudspeakers. Speech signals from one area in the vehicle may be redirected by the communication system to another area of the vehicle. Since the reverberation characteristics of vehicular cabins are sometimes complex, some of these systems produce acoustic feedback that may result in a breakdown of communication.

In addition to the microphones detecting the speech signals of the passengers, the microphones may detect audio signals generated by an audio device, such as a radio, a CD player, a DVD player, and/or any other audio device. The communication system may process these audio signals and convert the signals to audible sound through loudspeakers. These detected audio signals may generate electro-acoustic reverberations.

Therefore, there is a need for an improved communication system that facilitates passengers' conversation in vehicular cabins.

SUMMARY

A dereverberation and feedback compensation system reduces the echo of audio signals received from a first audio device while reducing feedback of speech signals received from a second audio device. A decorrelation logic decorrelates audio signals from a first audio device. A first processor generates a noise compensation signal based on the decorrelated audio signals and system determined filter coefficients. A second processor generates an enhanced noise correlation signal based on speech signals of a second audio device and the filter coefficients used by the first processor. The enhanced noise compensation signal may be broadcast through a speaker.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
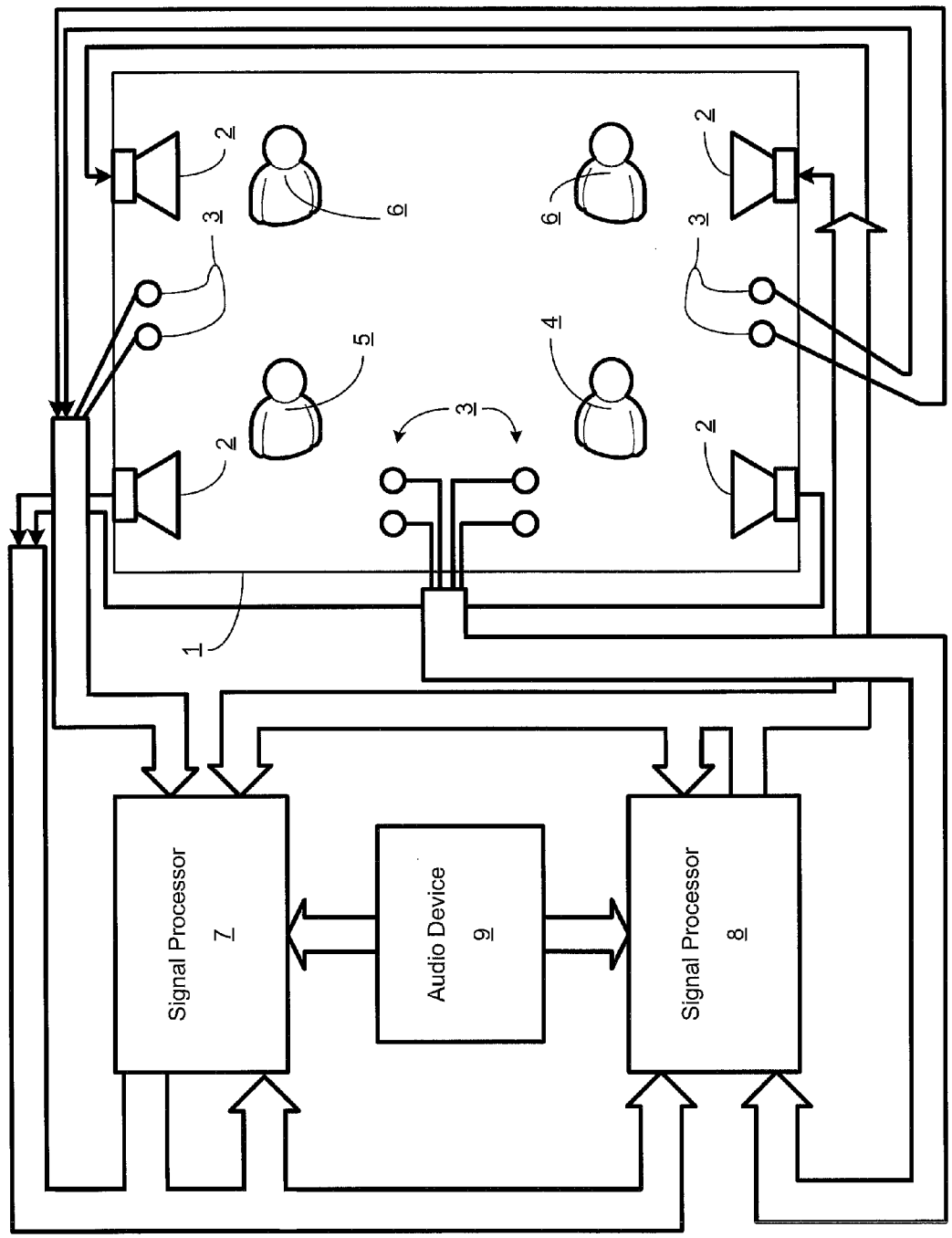
FIG. 1 is a schematic of a communication system.

FIG. 1 is a schematic of a communication system incorporated into a device or structure for transporting persons or things, such as a vehicle. In FIG. 1, the communication system is incorporated into a vehicle cabin 1, and comprises loudspeakers 2, microphones 3, and at least one signal processor 7 and/or 8. Loudspeakers 2 may be used to output audio signals to passengers in the vehicle cabin 1, while microphones 3 may detect passengers' verbal utterances. Loudspeakers 2 and microphones 3 may be mounted close to a driver 4, a front passenger 5 and back passengers 6. The communication system may also comprise an audio device 9, such as a radio, a CD player, and/or a DVD player. If a back passenger 6 is in dialog with front passenger 5, the conversation may be aided by the communication system by detecting the passengers' utterances through the use of microphones 3 close to the passengers 5 and/or 6 respectively, processing the received signals, and broadcasting the processed signals to the loudspeakers close to the passengers 5 and/or 6 respectively. Because the microphones 3 may also detect audio signals generated by audio device 9 and broadcast by loudspeakers 2, the communication system may also process these signals.

In FIG. 1, the communication system may receive audio signals generated by audio device 9 through microphones 3. The received audio signals may be received by a signal processor, such as a digital signal processor which may comprise hardware, software, or a combination of the two. A signal processor may be logically and/or physically divided into a first signal processor 7 that processes signals detected by the rear microphones, and a second signal processor 8 that processes signals detected by the front microphones. Alternatively, the signal processor may be a single device that processes signals detected by both the rear and front microphones. Both the first and second signal processors 7 and 8 may also be interfaced to audio device 9. Thus, the output of both the processed speech signals and the audio signals from audio device 9 (e.g., radio signals) may be provided by the first and second signal processors 7 and 8 and loudspeakers 2 at substantially the same time.

Prior to sending signals to loudspeakers 2, signal processors 7 and/or 8 may compensate or dampen (e.g. reduce in amplitude) the audio signals received from audio device 9. Adaptive filters comprising sets of filter coefficients for each of the loudspeakers 2 may be used to compensate or dampen the audio signals.

In FIG. 1, multiple microphones 3 are positioned within vehicle cabin 1. Audio signals transmitted by loudspeakers 2 may be detected by multiple microphones 3 and may be beamformed to obtain a beamformed signal d(n), where n denotes the discrete time index. The beamformed signal d(n) may comprise a combination of audio signals received by at least two of the multiple microphones. In FIG. 1, where four loudspeakers 2 are used, compensation could be carried out by the substraction shown in Equation 1.

$$e(n) = d(n) - \sum_{i=1}^{4}\sum_{k=0}^{N-1} \hat{h}_{i,k}(n)\tilde{x}_i(n-k) \quad \text{(Equation 1)}$$

In Equation 1, N is the filter length (e.g., the number of coefficients), the index i is the loudspeaker or loudspeaker channel ("loudspeaker")of the audio device, and $\hat{h}_{i,k}(n)$ represents the estimated impulse responses $\hat{h}_i(n)$. The estimated impulse responses $\hat{h}_i(n)$ models the real impulse responses $h_i(n)$ of the system's loudspeakers 2, microphones 3, and the vehicle cabin 1. $\tilde{x}_i(n)$ represents the audio signals of the loudspeakers, such as the four channels corresponding to the four loudspeakers in FIG. 1.

Since several kinds of audio signals may show correlations in terms of cross correlation or coherence, some numerical algorithms that may be used for the adaptation of the filter coefficients may not converge to the desired impulse responses of the entire loudspeaker-room-microphone-system. Therefore, prior to compensation, the audio signals $\tilde{x}_i(n)$ may be decorrelated.

Decorrelation of the audio signals $\tilde{x}_i(n)$ may be achieved through non-linear mapping, such as half wave rectification, where for each channel i:

$$x(n) = \begin{cases} (1+a)\tilde{x}(n), & \text{if } \tilde{x}(n) > 0, \\ \tilde{x}(n), & \text{else.} \end{cases} \quad \text{(Equation 2)}$$

In Equation 2, x(n) represents the decorrelated signal. Increasing the parameter "a" may result in a faster convergence, but also in a higher distortion factor (ripple-factor). The parameter "a" may be chosen between about 0.3 and about 0.7. An exemplary non-linear mapping is described in *Investigation of Several Types of Nonlinearities for Use in Stereo Acoustic Echo Cancellation*, by Morgan, D. R., Hall, J. L. and Benesty, J., IEEE Transactions on Speech and Audio Processing, Vol. 9, No. 6, p. 686, 2001, which is incorporated by reference.

Figure 2:
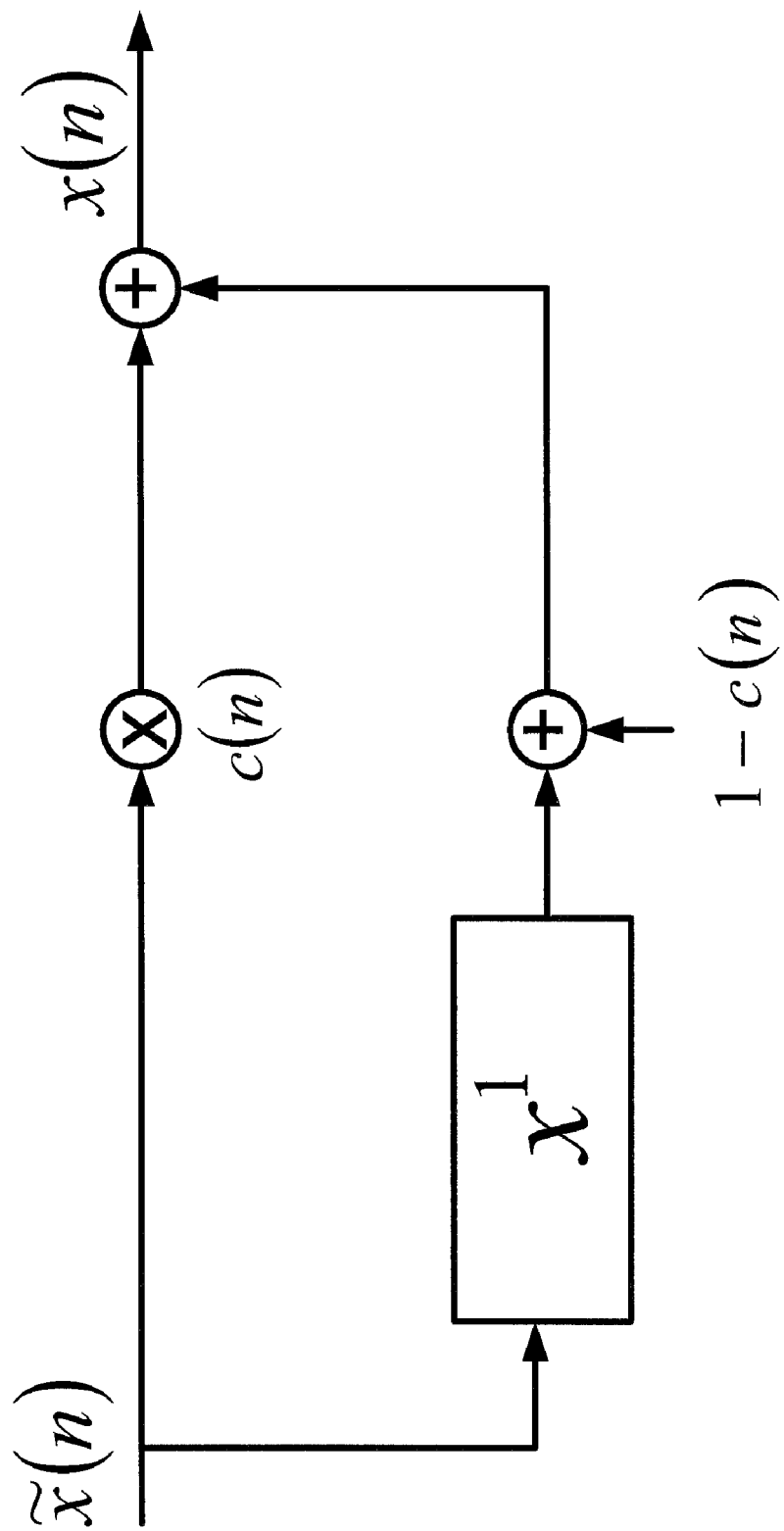
FIG. 2 is a block diagram of a time-dependent filter.

Alternatively, or in addition to the non-linear processing, the audio signals $\tilde{x}_i(n)$ may be decorrelated by filtering the signals through a time-dependent filter, such as a finite impulse response ("FIR") filter. The finite impulse response filter may use two different sets of filter coefficients that may be switched during a short interpolation phase. An exemplary filter is described in *A Stereo Echo Canceller with Correct Echo-Path Identification Based on Input-Sliding Technique*, by Sugiyama, A., Joncour, Y and Hirano, A., IEEE Transactions on Signal Processing, Vol. 49, No. 1, p. 2577, 2001, which is incorporated by reference. FIG. 2 is a block diagram of a finite impulse response filter. In FIG. 2, the finite impulse response filter's coefficients may be controlled by a periodic function c(n) having a period Q, where n represents a discrete time index. The value of the periodic function c(n) may be 0 or 1. During the first Q/2 iterations, c(n) may equal 1 and the filter output x(n) will be substantially identical to the input signal $\tilde{x}(n)$. For the following Q/2 iterations, c(n) may equal 0 and the filter output will be a one-sample delayed version of the input signal. These operations may be repeated every Q iterations. Degradation of the signals may be reduced by smoothly transitioning c(n) between 1 and 0, and vice-versa, over L/2 samples for each transition period. In addition to using time-dependent filters that may delay portions of the input signals, time-dependent filters may be employed that result in phase variations.

Figure 3:
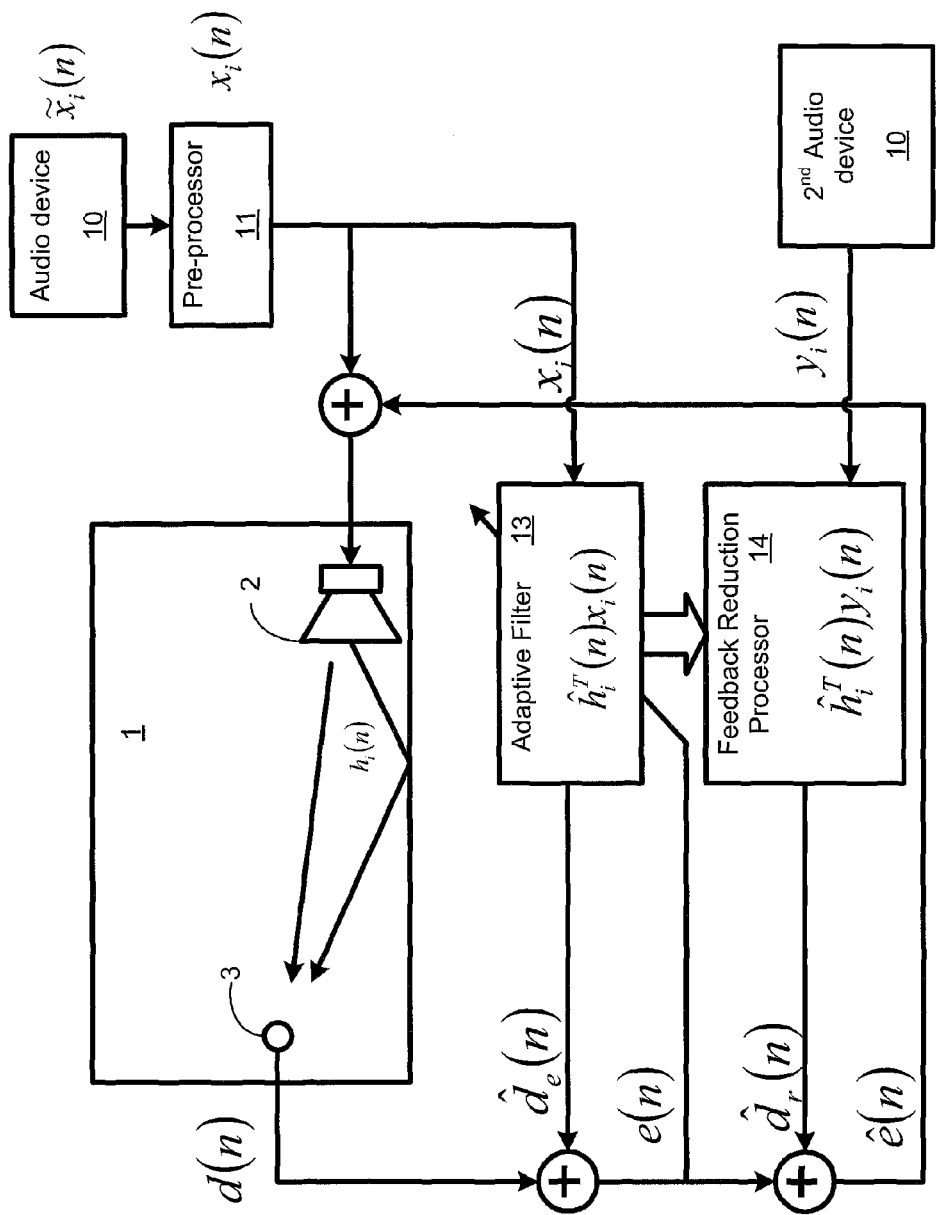
FIG. 3 is a block diagram of a dereverberation and feedback compensation system.

The feedback of speech signals, as described below, may be reduced by using the decorrelated audio signals $x_i(n)$ instead of the $\tilde{x}_i(n)$ signals to adapt filter coefficients and generate a noise compensation signal (e.g., error signal), e(n). FIG. 3 is a block diagram of a dereverberation and feedback compensation system. The dereverberation and feedback compensation system may be incorporated into the communication system in FIG. 1 or may operate on the outputs of the communication system in FIG. 1. To simplify the explanation, FIG. 3 includes one loudspeaker 2 and one microphone 3. However, multiple microphones and loudspeakers may be used and therefore the following equations include the index i to represent the general case of multiple loudspeakers. Audio signals $\tilde{x}_i(n)$ from an audio device 10, such as a radio, and/or CD player, and/or DVD player, and/or any other audio device, may be processed by pre-processor 11 to generate decorrelated signals $x_i(n)$ to be converted into audible sound by loudspeaker 2. Pre-processor may be a non-linear pre-processor, a time-dependent filter, or other processor that decorrleates audio signals $\tilde{x}_i(n)$. The decorrelated audio signals $x_i(n)$ are converted into audible sound by loudspeaker 2 and detected by microphone 3 according to some real impulse response $h_i(n)$.

The signal output of the microphone, d(n), is processed by a processor, such as an adaptive filter 13. This processing may employ a normalized least mean square method or a recursive least square algorithm, such as the exemplary algorithm described in *Adaptive Filter Theory*, by Haykin, S., Prentice Hill, N.J., 2002, which is incorporated by reference, to generate a noise compensation signal shown in Equation 3.

$$e(n) = d(n) - \sum_{i=0}^{M-1} \hat{d}_{e,i}(n) \quad \text{with} \quad \hat{d}_{e,i}(n) = \hat{h}_i^T(n)x_i(n), \quad \text{(Equation 3)}$$

where $\hat{h}_i(n) = [\hat{h}_{i,0}(n), \hat{h}_{i,1}(n), \ldots \hat{h}_{i,N-1}(n)]^T$ (Equation 4)

denotes the estimated impulse response of the i-th channel and $$x_i(n) = [x_i(n), x_i(n-1), \ldots x_i(n-N+1)]^T \quad \text{(Equation 5)}$$

is the vector of the last N signals from the audio device. The estimated impulse response, is corrected in the direction of a negative gradient of an appropriately chosen cost function J(e(n)):

$$\hat{h}_i(n+1) = \hat{h}_i(n) - m_i(n)\nabla_{\hat{h}_i}J(e(n)). \quad \text{(Equation 6)}$$

In one simple case the cost function is given by $J(e(n)) = E\{e^2(n)\}$ with E being the expectation value.

After estimating the impulse response $\hat{h}_i(n)$ between loudspeaker 2 and microphone 3, the feedback components of an audio signal from a second audio device 15, such as a loudspeaker that transmits a passenger's verbal utterances (e.g., a speech signal), may also be estimated. The feedback components of second audio device 15 are estimated by a processor, such as a feedback reduction function 14, using the same estimated impulse response used by adaptive filter 13 for compensation of the audio signals of audio device 10. To estimate the feedback components of second audio device 15, feedback reduction function 14, using filter coefficients $\hat{g}_i(n) = \hat{h}_i(n)$, calculates $$\hat{d}_{r,i}(n) = \hat{h}_i^T(n) y_i(n) \quad \text{(Equation 7)}$$

from the vector $y_i(n)$ that contains the last N output signals of the second audio device 15. Thus, the noise compensation signal $e(n)$ may be further enhanced by subtracting the feedback components associated with the output speech signal, $y_i(n)$. The enhanced noise compensation signal may be represented by:

$$\tilde{e}(n) = e(n) - \sum_{i=1}^{M-1} \hat{d}_{r,i}(n) \quad \text{(Equation 8)}$$

Where the audio signals $x_i(n)$ may be broadcasted by all of the loudspeakers, the output signals of the communication system $y_i(n)$ may be transmitted by the loudspeaker(s) close to the listening communication partner only. The respective output signals of the communication system $y_i(n)$ of the other channels are set to null.

Figure 4:
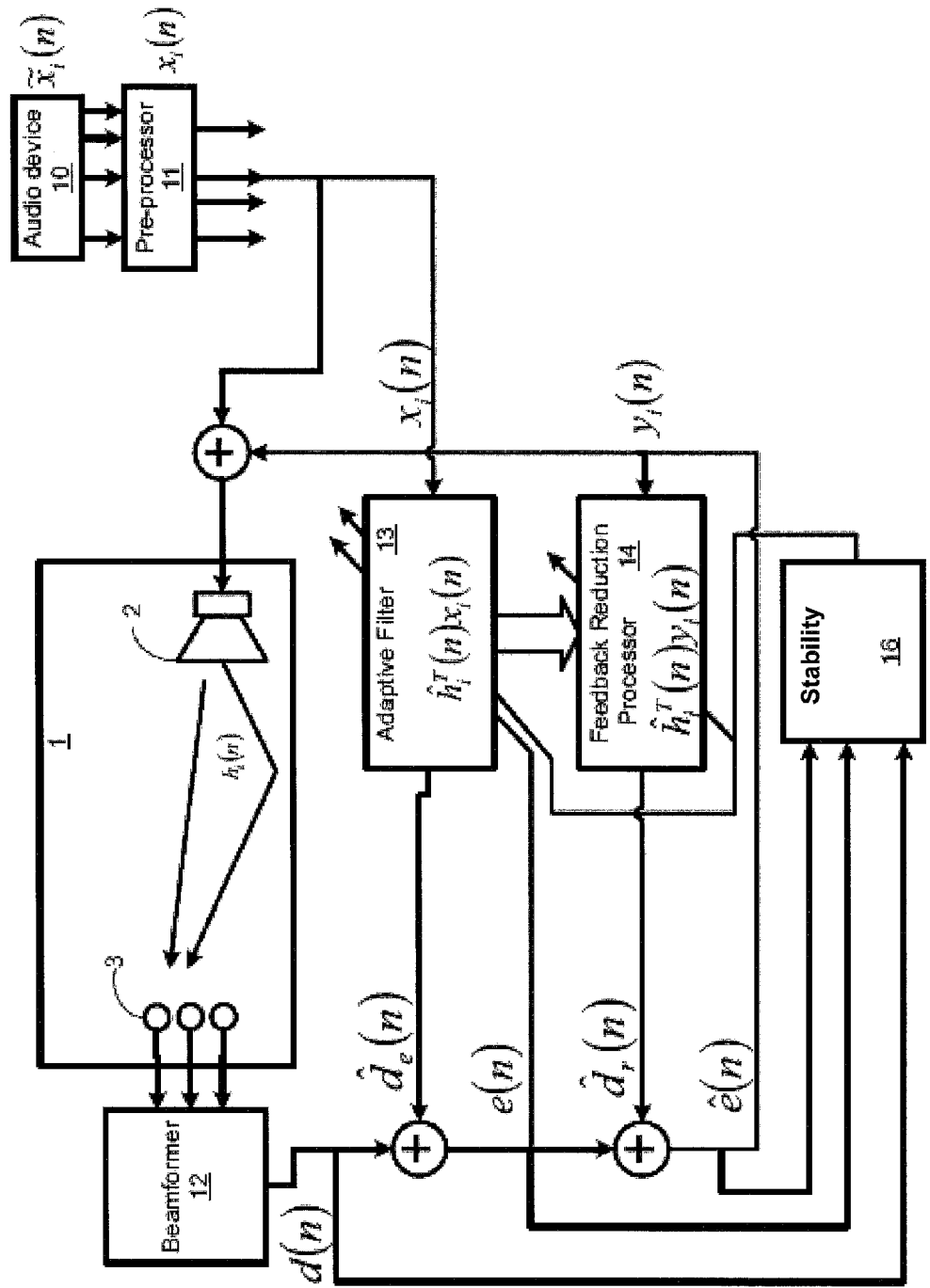
FIG. 4 is an alternate block diagram of a dereverberation and feedback compensation system.

FIG. 4 is an alternative diagram of a dereverberation and feedback compensation system. Signals may be received by multiple microphones 3, such as three microphones, and the outputs of the microphones may be processed by a beamformer 12 that combines the signals and generates one beamformed signal $d(n)$ with an enhanced signal-to-noise ratio. The beamformed signal $d(n)$ may be further processed by adaptive filter 13 to generate noise compensation $e(n)$.

A stability verification function 16 may be configured to verify the stability of the filter coefficients' adaptation. Stability verification may include calculating the short time powers $p_d(n)$, $p_e(n)$ and $p_{\tilde{e}}(n)$ of the signals $d(n)$, $e(n)$ and $\tilde{e}(n)$, recursively filtering the squares of the respective signals, and comparing some of the recursively filtered signals. Recursive filtering may be performed by Equations 9-11.

$$p_d(n) = \lambda p_d(n-1) + (1-\lambda) d^2(n) \quad \text{(Equation 9)}$$

$$p_e(n) = \lambda p_e(n-1) + (1-\lambda) e^2(n) \quad \text{(Equation 10)}$$

$$p_{\tilde{e}}(n) = \lambda p_{\tilde{e}}(n-1) + (1-\lambda) \tilde{e}^2(n) \quad \text{(Equation 11)}$$

In equations 9-11, $\lambda$ comprises a time constant and may be chosen to be between about 0.95 and about 0.999. To determine whether to weight the estimated impulse response by a weighting factor, stability verification function 16 compares $p_d(n)$ and $p_e(n)$ with each other. If stability verification function 16 detects that the short time power of the noise compensation signal is larger than the short time power of the beamformed signal, $p_e(n) > K p_d(n)$ with the constant K chosen to be between about 1 dB and about 3 dB, then the estimated impulse response is weighted by a factor $p_e$ (e.g., leakage factor) with $0 < p_e < 1$.

Additionally, stability verification function 16 compares $p_{\tilde{e}}(n)$ and $p_d(n)$ with each other to determine if an additional weight factor is to be applied to the estimated impulse response. If stability verification function 16 detects that the short time power of the enhanced noise compensation signal is larger than the short time power of the beamformed signal, $p_{\tilde{e}}(n) > K p_d(n)$, then the estimated impulse response may also weighted by a factor $p_{\tilde{e}}$ with $0 < p_{\tilde{e}} < p_e < 1$. The weighting of the estimated impulse response results in a dampening of the estimated impulse response within a few sample rates in the case that an instability is excited.

Some dereverberation and feedback systems are capable of processing audio signals in formats other than discrete time. In these systems, instead of processing the audio signals in the time domain, the signal output of the microphone and/or beamformed signal may be digitized and Fourier transformed and processed in the frequency domain.

Additionally, some dereverberation and feedback compensation systems may be used with different types of beamformers. A beamformer may comprise a delay-and-sum beamerformer that exploits the lag time of a signal that may arrive at the different microphones. Alternatively, an adaptive weighted sum beamformer may be used which may combine time aligned signals $a_m$ of M microphones weighted by non time-independent weights $$A_m \left( \text{e.g., } d(n) = \sum_{m=1}^{M} A_m a_m(n) \right).$$

To maintain sensitivity in the desired direction and to minimize sensitivity in the direction of noise, the weights may have to be periodically recalculated.

Figure 5:
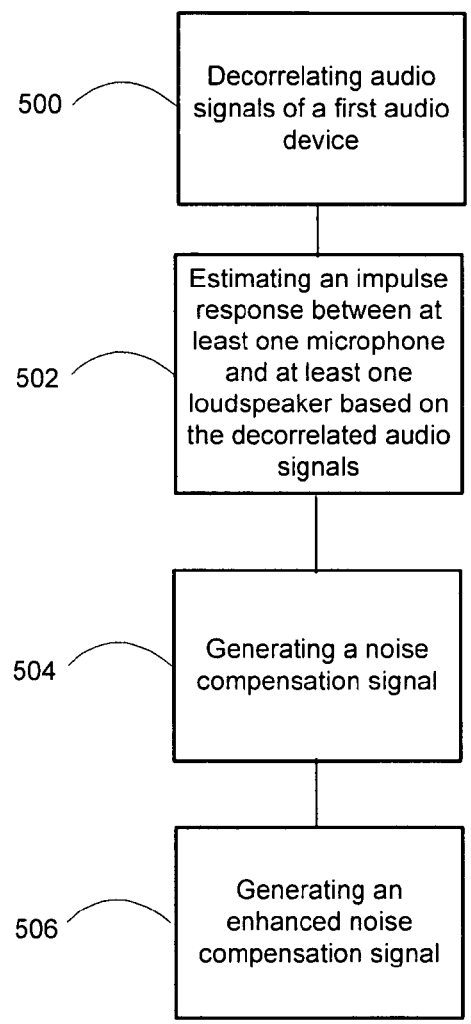
FIG. 5 is a flow diagram of a dereverberation and feedback compensation system.

FIG. 5 is a flow diagram of a dereverberation and feedback system. At act 500, the system receives audio signals from a first audio device, such as a radio; and/or a CD player; and/or a DVD player, and decorrelates the audio signals. The audio signals may be decorrelated by a non-linear process, such as half-wave rectification, or by a time-dependent filter, such as a finite impulse response filter.

At act 502, the decorrelated signals are output from loudspeakers, and for each loudspeaker or loudspeaker channel ("loudspeaker") in the system, an impulse response is estimated between a receiving microphone and each transmitting loudspeaker. Automatically adapted filter coefficients may be determined from the estimated impulse response. An adapted filter using the determined filter coefficients may be used to process the first audio device's audio signals received at a microphone. Adaptation of the filter coefficients, determination of appropriate filter coefficients, may be achieved by the gradient method employing a suitable cost function. An exemplary adaptation is described in *Acoustic Echo and Noise Control*, by E. Hänsler and G. Schmidt, John Wiley & Sons, New York, 2004; *Adaptive Filter Theory*, by Haykin, S., Prentice Hill, N.J., 2002, which is incorporated by reference.

At act 504, a noise compensation signal is generated by filtering the signal output of the microphone on the basis of the estimated impulse response and the decorrelated audio signals. The noise compensation signal is generated by subtracting a signal representing undesirable signal variations, such as perturbations, from the signal output by the microphone. The subtracted signal, used to obtain the noise compensation signal, may be obtained by summing the convolution of the estimated impulse response for each loudspeaker that is obtained after adaptation of the respective filter coefficients has been completed with the decorrelated audio signal of the respective loudspeaker.

At act 506, an enhanced noise compensation signal may be generated by convolving the estimated impulse response for each loudspeaker with the respective audio signal of a second audio device, such as a loudspeaker that transmits a speech signal, and subtracting the sum of the results from the noise compensation signal.

Figure 6:
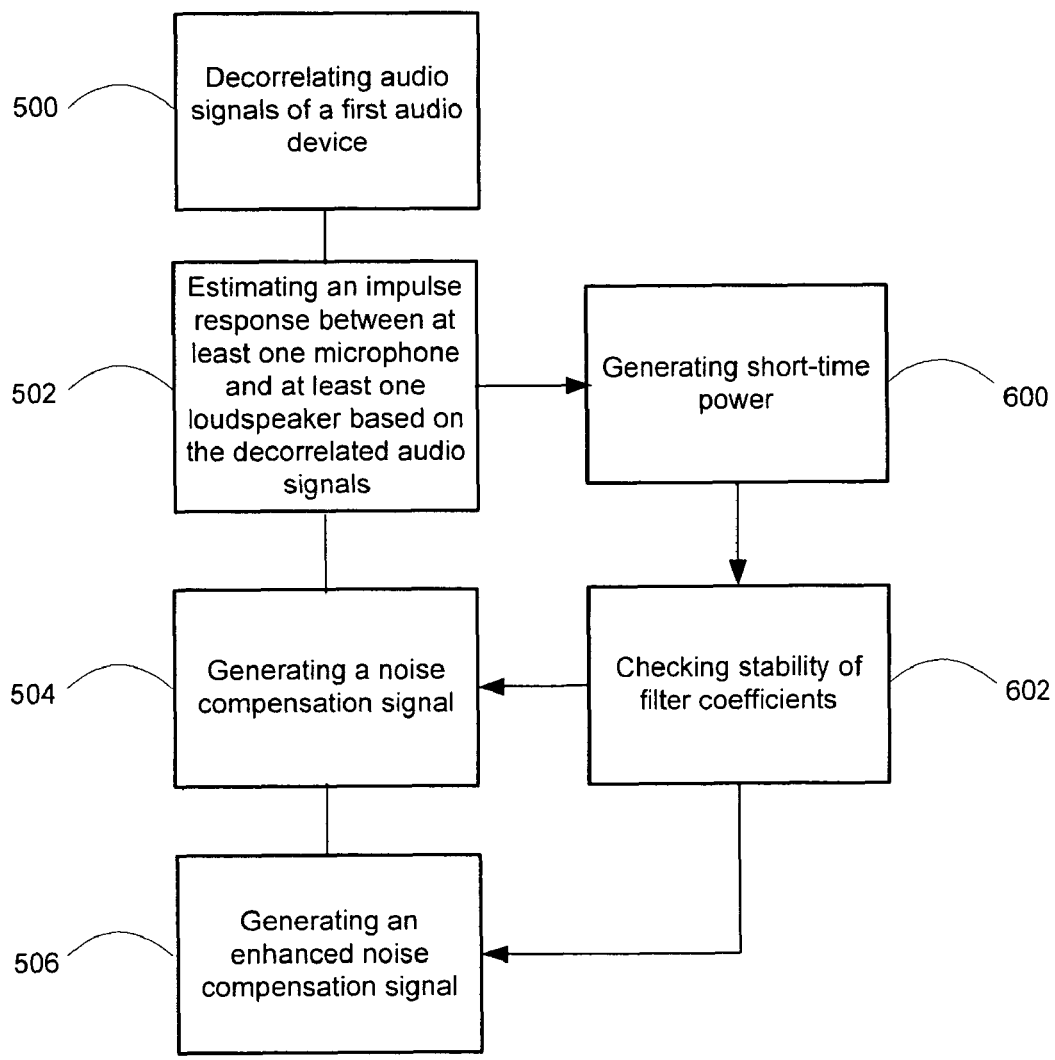
FIG. 6 is a second flow diagram of a dereverberation and feedback compensation system.

FIG. 6 is a second alternate flow chart of a dereverberation and feedback system. At act 600, the short-time power of the signal output by the microphone, the noise compensation signal, and the enhanced noise compensation signal may be generated.

At act 602, the stability of the filter coefficients may be verified. Verification of the filter coefficients' stability may include comparing the short-time power signal of the noise compensation signal with the short-time power signal output by the microphone. If the short-time power signal of the noise compensation signal is larger than the short-time power signal output by the microphone, then the estimated impulse response may be weighted by a leakage factor $p_e$ with $0 < p_e < 1$. Additionally, the short-time power of the enhanced noise compensation signal may be compared with the short-time power of the signal output by the microphone. If the short-time power of the enhanced noise compensation signal is larger than the short-time power of the signal output by the microphone, then the estimated impulse response can also be weighted by a second leakage factor $p_{\tilde{e}}$ with $0 < p_{\tilde{e}} < p_e < 1$.

Figure 7:
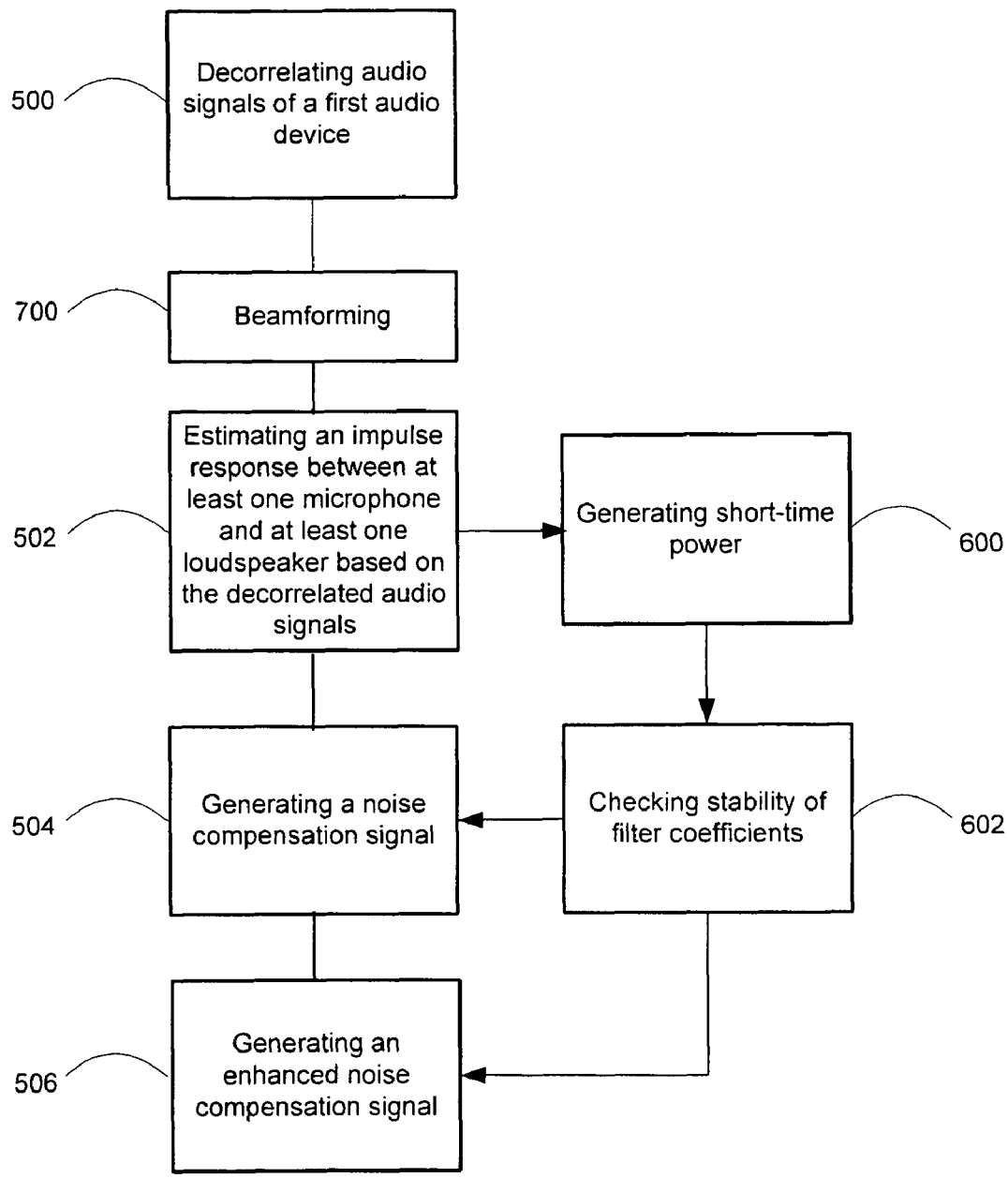
FIG. 7 is a third flow diagram of a dereverberation and feedback compensation system.

FIG. 7 is a third alternate flow chart of a dereverberation and feedback system. At act 700, signals received at microphones are beamformed resulting in a beamformed signal with an enhanced signal-to-noise ratio. By using multiple microphones, different spatial characteristics of speech and noise may be exploited which may result in the suppression of some background noises.

The methods shown in FIGS. 5-7, in addition to the other methods described, may be encoded in a signal-bearing medium, a computer-readable medium such as a memory, programmed within a device such as one or more integrated circuits, or processed by a controller, a processor, or a computer. If the methods are performed by software, the software may reside in a memory resident to or interfaced to the dereverberation and feedback compensation system. The memory may include an ordered listing of executable instructions for implementing logical functions. A logical function may be implemented through digital circuitry, through source code, through analog circuitry, or through an analog source such as through an electrical, audio, or video signal stored or processed by logic. The software may be embodied in any computer-readable or signal bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal medium," and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of machine-readable medium would include: an electrical connection (electronic) having one or more wires, a portable magnetic or optical disk, a volatile memory such as Random Access Memory "RAM" (electronic), a Read-Only Memory "ROM" (electronic), an Erasable Programmable Read-Only Memory (EPROM or Flash Memory) (electronic), or an optical fiber (optical). A machine-readable medium may also include a tangible medium upon which software is printed, as the software may be electronically stored as an image or in another format (e.g., through an optical scan), the compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of processing audio signals, comprising:
   decorrelating one or more audio signals of a first audio device;
   estimating, for each of one or more loudspeakers, an impulse response between one or more microphones and the one or more loudspeakers based on the decorrelated audio signals;
   generating a noise compensation signal based on each of the estimated impulse responses and audio signals of the first audio device received at a microphone; and
   generating an enhanced noise compensation signal based on each of the estimated impulse responses and audio signals of a second audio device.

2. The method of claim 1, where the noise compensation signal comprises substantially removing a convolution sum of each of the estimated impulse responses and the decorrelated audio signals of the first audio device from the audio signals of the first audio device received at the microphone.

3. The method of claim 2, where the enhanced noise compensation signal comprises substantially removing a convolution sum of the estimated impulse response and the audio signal from the second audio device from the noise compensation signal.

4. The method of claim 3, where the act of decorrelating the audio signals of the first audio device comprises applying non-linear process means or time-dependent filtering means.

5. The method of claim 4, further comprising combining the audio signals of the first audio device received at the microphone into a combined signal.

6. The method of claim 4, further comprising:
   determining a short-time power of the decorrelated audio signal of the first audio device received at the microphone;
   determining a short-time power of the noise compensation signal; and
   applying a weighting factor to each estimated impulse response when the short-time power of the noise compensation signal exceeds the short-time power of the decorrelated audio signal of the first audio device received at the microphone.

7. The method of claim 6, where the weighting factor is less than about one.

8. The method of claim 4, further comprising:
   determining a short-time power of the decorrelated audio signal of the first audio device received at the microphone;
   determining a short-time power of the enhanced noise compensation signal; and
   applying a weighting factor to each estimated impulse response when the short-time power of the enhanced noise compensation signal exceeds the short-time power of the decorrelated audio signal of the first audio device received at the microphone.

9. The method of claim 8, where the weighting factor is less than about one.

10. An audio signal processing system, comprising:
an audio input to receive audio signals from a microphone, wherein the audio input is a device that connects to the microphone;
an audio output to transmit audio signals to a loudspeaker, wherein the audio output is a device that connects to the loudspeaker;
a second audio input to receive art audio signal from a first audio device, wherein the second audio input is a device that connects to the first audio device;
a decorrelation function configured to decorrelate the audio signal received from the first audio device;
an adaptive filter function configured to generate a noise compensation signal based on adapted filter coefficients and the decorrelated audio signal of the first audio device; and
a feedback reduction function configured to generate an enhanced noise compensation signal based on the adapted filter coefficients of the adaptive filter friction and an audio signal of a second audio device.

11. The system of claim 10, where the noise compensate signal comprises a difference between the audio signal of the first audio device received at the microphone and an output of the adaptive filter function.

12. The system of claim 11, where the enhanced noise compensation signal comprises a difference between the noise compensation signal and an output of the feedback reduction function.

13. The system of claim 12, where an output signal comprises the enhanced noise compensation signal added to the decorrelated audio signal of the first audio device.

14. The system of claim 13, further comprising a stability verification function configured to determine the short-time power of the audio signal of the first audio device received at the microphone, the noise compensation signal, and the enhanced noise compensation signal.

15. The system of claim 14, where the microphone further comprises a plurality of microphones spaced apart and configured to exploit a lag time of a signal that may arrive at the different microphones.

16. The system of claim 15, where the decorrelation function is configured to decorrelate the audio signal of the first audio device in a time domain signal.

17. The system of claim 15, where the decorrelation function is configured to decorrelate the audio signal of the first audio device in a frequency domain signal.

18. The system of claim 15, where the decorrelation function comprises a non-linear process.

19. The system of claim 15, where the decorrelation function comprises a time-dependent filter.

20. The system of claim 15, where the time-dependent filter is configured to delay a portion on an input signal by one sample.

21. A non-transitory computer readable storage medium containing a set of computer-readable instructions configured to be executed by a processor to perform a method comprising:
decorrelating one or more audio signals received from a first audio device;
estimating, for each of one or more loudspeakers, an impulse response between one or more microphones and the one or more loudspeakers based on the decorrelated audio signals;
generating a noise compensation signal based on each of the estimated impulse responses and audio signals of a first audio device received at a microphone; and
generating an enhanced noise compensation signal based on each of the estimated impulse responses and audio signals of a second audio device.

* * * * *

UNITED STATES PATENT AND TRADEMARK OFFICE
CERTIFICATE OF CORRECTION

PATENT NO.         : 8,165,310 B2
APPLICATION NO.    : 11/411004
DATED              : April 24, 2012
INVENTOR(S)        : Christoph et al.

It is certified that error appears in the above-identified patent and that said Letters Patent is hereby corrected as shown below:

In FIG. 3, the second audio device currently labeled with reference numeral 10 should be labeled with reference numeral 15.

At column 4, line 54, equation 4, " $\hat{h}_i(n) = [\hat{h}_{i,0}(n), \hat{h}_{i,1}(n), \ldots \hat{h}_{i,}N-1(n)]^T$ " should be changed to -- $\hat{h}_i(n) = [\hat{h}_{i,0}(n), \hat{h}_{i,1}(n), \ldots \hat{h}_{i,N-1}(n)]^T$ --.

At column 5, line 62, "...1 dB..." should be changed to -- 1 dB (decibel) --.

At column 5, line 63, "...a factor p.sub.e..." should be changed to -- ρ.sub.e --.

At column 5, line 64, "...with 0<p.sub.e<1..." should be changed to -- with 0<ρ.sub.e<1 --.

At column 6, line 5, "...a factor p.sub.ẽ with 0<p.sub.ẽ<p.sub.e<1..." should be changed to -- a factor ρ.sub.ẽ with 0<ρ.sub.ẽ<ρ.sub.e<1 --.

At column 7, line 19, "...a leakage factor p.sub.e with 0<p.sub.e<1..." should be changed to -- a leakage factor ρ.sub.e with 0<ρ.sub.e<1 --.

At column 7, line 26, "...a second leakage factor p.sub.ẽ with 0<p.sub.ẽ<p.sub.e<1..." should be changed to -- a second leakage factor ρ.sub.ẽ with 0<ρ.sub.ẽ<ρ.sub.e<1 --.

At column 9, line 13, claim 10, "...receive art audio signal..." should be changed to -- receive an audio signal --.

At column 9, line 24, claim 10, "...adaptive filter friction..." should be changed to -- adaptive filter function --.

Signed and Sealed this
Twenty-ninth Day of January, 2013

David J. Kappos
*Director of the United States Patent and Trademark Office*

CERTIFICATE OF CORRECTION (continued)
U.S. Pat. No. 8,165,310 B2

At column 9, lines 26-27, claim 11, "...the noise compensate signal..." should be changed to -- the noise compensation signal --.